Nov. 1, 1938.  E. A. ARP  2,134,773
MACHINE TO BEND OR TWIST CONNECTING RODS
Filed Oct. 31, 1934
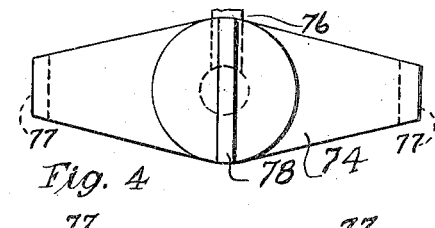
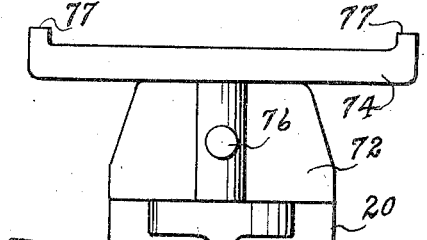
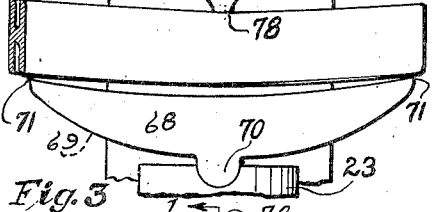
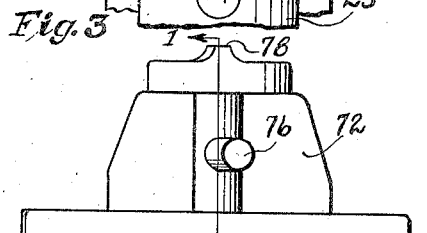
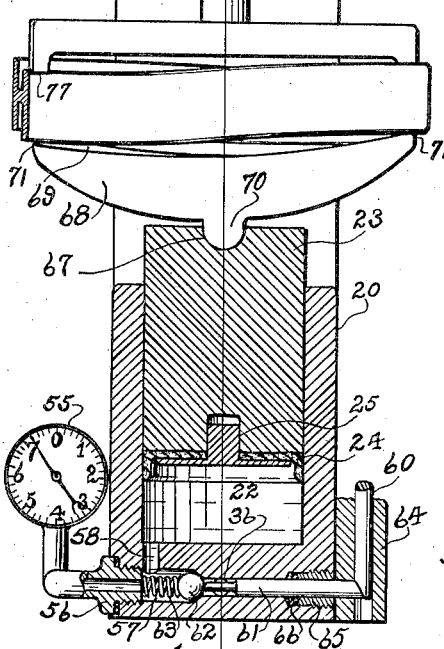
Inventor
Ewald A. Arp.

Patented Nov. 1, 1938

2,134,773

UNITED STATES PATENT OFFICE 2,134,773

MACHINE TO BEND OR TWIST CONNECTING RODS

Ewald A. Arp, Minneapolis, Minn.

Application October 31, 1934, Serial No. 750,832

10 Claims. (Cl. 153—78)

My invention relates to a pressure press with engaging jaws for bending or twisting I beam shaped material under controlled pressure, and more particularly to the bending or twisting of the I beam section of connecting rods, to create the proper alignment between the crankshaft and wrist pin bearings. I have reference to such connecting rods as are ordinarily used in internal combustion engines. Connecting rods for this purpose are ordinarily made in the shape of an I beam section with one end formed to provide the one half of the crankshaft bearing, to which a bearing cap is bolted, and the opposite end formed to provide the piston or wrist pin bearing. The crankshaft and wrist pin bearings of a connecting rod must be both parallel and in line with each other. In service, through wear, heat and stresses, these bearings lose their alignment and it has become common practice to bend the I beam section to re-align bearings that are not parallel to each other, and to twist the I beam section to re-align bearings that are not in line with each other. The common manner in which the I beam section of a connecting rod is bent or twisted is by applying two wrenches, or a wrench and vise. In using this method it is very difficult to control the amount of bend or twist to obtain the correct alignment of its bearings.

One object of my invention is to provide a uniform means for either bending or twisting various size connecting rods, with the movement of but one set of engaging jaws and application of pressure. Another object is to provide a gauging means to indicate the pressure exerted in either bending or twisting. Still another object is to provide a pressure press adapted to be controlled entirely by the manipulation of a pawl and a pump handle and constructed to cause a connecting rod to be operated upon to be rapidly engaged, bent or twisted by exertion of desired pressure against the connecting rod, and released and cleared for easy removal from the pressure press and checking. Other objects will appear in the further description of my invention, in which reference is had to the drawing accompanying and forming part of this specification, and in which—

Figure 1 is a side elevation of my invention, mostly in vertical section, and showing the twisting of an I beam section. The parts shown in section are taken on the line 1—1, in Fig. 2. Fig. 2 is a front elevation comparing with Fig. 1, showing the twisting of an I beam section. The parts shown in section are taken on the line 2—2, in Fig. 1. Fig. 3 is a fragmentary view showing the arrangement for bending an I beam or other shaped section. Fig. 4 shows the member which cooperates to provide both bending and twisting means. Fig. 5 is an enlarged view looking down on the pump handle, showing detail for the rapid raising of the ram. The parts shown in section are taken on the line 5—5, in Fig. 1. Figs. 6 and 7 are enlarged views detailing the mechanism for operating the pawl for lifting the ram. Fig. 8 shows a portion of the pump handle in position for releasing fluid pressure and dropping the ram.

In Fig. 1, numeral 20 represents the main frame of my machine forming a well 21 and a hollow cylinder 22 between which fluid is adapted to pass through suitable openings. A ram 23 is slidably fitted to the hollow cylinder 22, and said ram includes a packing cup 24, of leather or other suitable material, for precluding the passage of fluid past the ram. The packing cup 24 is held in place by a flanged pin 25. The ram 23 is adapted to be raised or actuated, first, by a mechanical lift for rapid movement of the ram to the work to be performed, and second, in response to the pumping of fluid into the hollow cylinder 22 and beneath said ram. Of said mechanical lift, 27 is a plate attached to the ram, as by a screw 26, and having notches or teeth 28. A pawl 29 is adapted to engage the notches or teeth 28, and said pawl is attached to a longitudinally movable pump plunger 30 by means of a pin 31 in a bracket 32 held to the plunger by a screw 33. Said pump plunger 30 is mounted and guided in the main frame of the machine in a manner to be made plain. When the pawl 29 is in engagement with one of the notches or teeth 28 and the pump plunger 30 is elevated, it will be obvious that the ram 23 will also be elevated. A handle 34, secured to a shaft with gear 35 mounted on the main frame and engaging a rack on the pump plunger 30, is adapted to be raised to rotate the gear and thus elevate said pump plunger and with it the ram 23, through the instrumentality of the pawl 29. In such manner, said ram 23 is quickly raised to cause engagement between the tools of the machine and a connecting rod to be operated upon, as will be hereinafter made clear. A fluid passageway 36 between the well 21 and the hollow cylinder 22 and a pump cylinder 51 is controlled by a spring actuated check valve 37 which precludes the passage of fluid from the hollow cylinder 22 and the pump cylinder 51 to the well 21, but is adapted to permit flow of fluid in opposite direction. A gravity actuated check valve 38 at the base of the hollow cylinder 22 permits flow of fluid upwardly through the base of said hollow cylinder and prevents flow of fluid in opposite direction.

Evidently, upon raising the ram 23 in the manner as before stated, fluid will be drawn from the well 21 through the passageway 36 and past the check valves 37 and 38, into the hollow cylinder 22. Upon lowering the handle 34 the ram 23 will be prevented from returning to a depressed condition because the fluid which has entered the hollow cylinder 22 will be precluded from flowing out of said hollow cylinder by the check valve 38.

After the ram 23 has been raised so that the tools engage the work, as has been set forth, fluid under pressure is pumped from the well 21 into the hollow cylinder 22. The pumping mechanism is of well known construction. As disclosed, the pump plunger 30 is sealed against leakage for suction and discharge by a packing cup 46 held in position by a sleeve 47. On its upward or suction stroke, said pump plunger 30 draws fluid past the check valve 37 by overcoming the light tension of its spring 48, the fluid passing from the well 21 through the passageway 36, a hole 49 in a retaining nut 50 for said spring 48 and into the pump cylinder 51. A plug 52 screwed into the frame 20 prevents leakage from said pump cylinder 51. On its downward or pressure stroke, the pump plunger 30 forces fluid from the pump cylinder 51 back through the hole 49 and past the check valve 38 into the hollow cylinder 22, to create lifting pressure under the ram 23. Upon the cessation of the upward or suction stroke of the pump plunger 30, the check valve 37 seats and remains seated throughout the downward or pressure stroke of said pump plunger. A valve guard 53, held in place by a screw 54, keeps the check valve 38 in position to drop by gravity to prevent fluid from passing from the hollow cylinder 22 to the passage between the pump cylinder 51 and said hollow cylinder 22.

The pumping of the fluid into the hollow cylinder 22 and beneath the ram 23 is accomplished by oscillation of the handle 34, to reciprocate the pump plunger 30 vertically, and without interference with the operation of the pawl 29. Or, stated differently, during the pumping operation, the pawl 29 will be tipped to position clear of the notches or teeth 28, as disclosed in dotted lines in Fig. 1 and in Fig. 7.

It being assumed that the pawl 29 was manually moved into engagement with a notch or tooth 28, as in full lines in Fig. 1, and thereafter the ram was elevated by raising the handle 34, upon the first following downward movement of said handle, and consequent pumping stroke of the pump plunger, said pawl 29 is moved to said position as in dotted lines in Fig. 1, or as in Fig. 7, and remains in this position of disengagement from the notches or teeth 28 during the successive pumping strokes, and until the pawl is again manually engaged with said notches or teeth. To this end, a pivot pin 40, fitted for free rotative movement in the member 32, fixedly carries a lever 39 having a shaped end portion 41 formed of spring material and adjusted to frictionally engage a vertical pin 42 upon the frame 20 during the full stroke of the pump plunger 30. When the pawl 29 is manually moved or swung into position of engagement with the notches or teeth 28, a pin 43 which projects from the pin 31, fixed to the pawl 29, contacts with a projection 44 on the lever 39 and rotates said end portion 41 upon the pivot pin 40 as an axis to the position as in Fig. 6. During this operation, the end portion 41 slides and/or turns on the vertical pin 42 at the location of engagement with said vertical pin. A stop pin 45 upon the bracket 32 is for limiting the downward movement of said end portion 41 and hence the upward movement of the projection 44, to thus limit the extent to which the pawl 29 can swing in direction toward the plate 27. Upon the first downward movement of the handle 34, after the upward movement with the pawl engaged with a notch or tooth to elevate the ram, the end portion 41, frictionally engaging the vertical pin 42, rotates the lever 39 into the receded position of the pawl 29, as in Fig. 7, and in dotted lines in Fig. 1. Evidently, upon downward movement of the pump plunger, the projection 44 moves against the projecting pin 43 and tips the pawl 29 to a receded position of overhanging gravity, where said pawl will remain until again manually moved or swung into engagement with the notches or teeth 28. With upward and downward movement of the pump plunger 30, the end portion 41 frictionally slides along the pin 42. When the pawl 29 is in receded position, upward reciprocation of the pump plunger first causes the lever 39 and the stop pin 45 to become engaged and the end portion 41 to thereafter slide upwardly along the vertical pin 42, and downward reciprocation of said pump plunger first causes said lever 39 to be positioned as in Fig. 7, with the projection 44 engaging the pin 43, and said end portion 41 to thereafter slide downwardly along said vertical pin 42. Thus, obviously, the pumping action or vertical reciprocation of the pump plunger 30 will not remove the pawl 29 from its receded position, that is, from its position as in dotted lines in Fig. 1.

A pressure gage of common construction is indicated 55. Said pressure gage is communicated with by the hollow cylinder 22 by way of a port 58 through the base of said hollow cylinder, a passageway 57 in the frame 20 beneath said port 58, and a hollow nut 56 attached to said frame 20 and to a pipe leading to the gage. Evidently, pressure in the hollow cylinder 22 will be registered at the pressure gage 55. During the operation of the machine, pressure in said hollow cylinder 22 is manually released and the ram 23 is allowed to drop by gravity when a desired and predetermined pressure is shown to be registered on the pressure gage 55.

The reciprocatory pumping strokes of the pump plunger 30 require only limited upward swinging movement of the handle 34, to position considerably short of a vertical position. When it is desired to release pressure from the hollow cylinder 22, the pressure gage when employed so indicating, the handle 34 is swung upwardly substantially to vertical position, as in Fig. 8, to cause a shaped projection 59 on said handle to impart longitudinal movement to a rod 60 slidably mounted in a guide member 64 carried by the frame 20. The rod 60 includes an oblique end opposite the end of said rod engaged by the shaped projection 59, and said oblique end is contiguous with the oblique end of a second rod 61 at right angles to the rod 60 and slidably mounted in the frame 20 beneath the hollow cylinder 22 and adjacent the passageway 57 and the well 21. Longitudinal movement of said rod 60, resulting from manipulation of the handle 34 to substantially vertical position, causes the oblique end of the rod 60 to slide over the oblique end of the rod 61 and move said rod 61 from right toward left in Fig. 2. The end portion of the rod 61 opposite the oblique end is reduced and is surrounded by a passageway between the passageways 36 and 57. Said passageway about the reduced portion of said rod is in constant communication with said passageway 36, and a check valve 62 in the passageway 57 is controlled by a coil spring 63 to normally preclude passage of fluid from the passageway 57 to the passageway 36. Movement of the rod 61 from right toward left in Fig. 2 as stated, causes the reduced portion of said rod 61 to unseat the check valve 62 against the resilient action of the coil spring 63 and thus release the pressure in the hollow cylinder 22 by affording communication from said hollow cylinder to the well 21 by way of the port 58, the passageway 57, the passageway about the reduced portion of the rod 61 and the passageway 36, as will be understood. The weight of the ram 23 will cause this to drop and force the fluid out of the hollow cylinder. Upon movement of the handle 34 away from vertical position to remove the shaped projection 59 from the rod 60, the coil spring 63 will seat the check valve 62 and return the rods 61 and 60 to their normal positions, as in Fig. 2. A packing nut 65 and a packing gland 66 preclude leakage of fluid past the rod 61.

A part-circle depression or socket 67 extending across the upper surface of the ram 23 swingably or rotatably supports front and rear rocker jaws, denoted 68 and 69, respectively. As disclosed, the lower surface of each rocker jaw 68, 69 includes a part-circle projection 70, desirably at the midlength of the rocker jaw, which is oscillatably mounted in the depression or socket 67. The rocker jaws 68 and 69 are desirably contiguous with each other but are not connected, and the upper surfaces of said rocker jaws are hollowed or shaped to form four anvil ends 71, there being two anvil ends upon each rocker jaw.

A support 72 of the frame 20 above the rocker jaws 68 and 69 overhangs said rocker jaws and is provided with a vertical concavity 73 adapted to receive the shank of a tool, denoted 74, which is complemental to the rocker jaws 68 and 69. The shank of the tool 74 has length equal to the thickness in vertical measurement of the support 72, and said tool is associated with said support and its concavity so that the working elements of the tool are in any case in engagement with the flat upper and lower surfaces of the support. That is to say, when a connecting rod is to be twisted in the machine, the tool 74 is positioned as in Figs. 1 and 2, so that the working element thereof including spaced apart operating surfaces 77 opposite the anvil surfaces 71 is contiguous with the lower surface of the support 72 and the working element including a central rib 78 is contiguous with the upper surface of said support, and when a connecting rod is to be bent said tool is positioned as in Fig. 3, so that said working element including said rib 78 is contiguous with the lower surface of the support and said working element including said operating surfaces 77 is contiguous with the upper surface of said support.

In the operation of bending a connecting rod, the I-beam section thereof is placed on and parallel with the rocker jaws 68 and 69 so that one flange of the connecting rod rests upon the opposite anvil ends 71 of the front rocker jaw 68 and the other flange of said connecting rod rests upon the opposite anvil ends 71 of the rear rocker jaw 69. Upon elevation of the ram 23 and the application of lifting pressure against the ram, in the manner as before described, both flanges of the I-beam section of the connecting rod are forced by the anvil ends 71 against the rib 78 of the tool 74, and said I-beam section is bent into the hollow between said anvil ends 71, as will be clear. Should it be desired to bend this same connecting rod in opposite direction, the ram is caused to drop, in the manner as already set forth, the connecting rod is turned over, and the bending operation as just stated is repeated.

In the operation of twisting a connecting rod, the I-beam section thereof is placed on the rocker jaws 68 and 69 in the same way as when a connecting rod is to be bent. A handle 76 upon the shank of the tool 74 is for swiveling or rotating said tool horizontally in the vertical concavity 73. By swiveling or rotating said tool in one direction, opposite operating surfaces 77 can engage opposite flanges of the I-beam section, as shown in Figs. 1 and 2, and by swiveling or rotating the tool in opposite direction, the operating surface 77 at the right in Fig. 1 can be made to engage the forward flange of the I-beam section, instead of the rearward flange as shown, while the operating surface at the left in said Fig. 1 can be made to engage the rearward flange of the I-beam section, instead of the forward flange as disclosed. Obviously, when pressure is applied to the ram 23 to elevate the rocker jaws 68 and 69 with a connecting rod positioned in the machine as in Fig. 1, said connecting rod will be twisted in one direction, and when the positions of the operating surfaces are reversed as explained and pressure is applied to elevate the rocker jaws, the connecting rod will be twisted in opposite direction. Naturally, pressure will be released from the hollow cylinder 22 while the handle 76 is being manipulated to set the operating surfaces 77 at desired position. That a connecting rod situated in the machine as in Figs. 1 and 2, or situated in the reverse position referred to, will be twisted on the application of upward pressure against the ram 23 is obvious. In Fig. 2 the front flange of the connecting rod is unsupported above the right hand anvil end 71 of the front rocker jaw 68 and the rear flange of said connecting rod is unsupported above the left hand anvil end 71 of the rear rocker jaw 69. When, then, pressure is applied by the ram 23, the I-beam section is evidently gripped and twisted in a clockwise direction. Swiveling or rotating the handle 76 to the left in Fig. 2 causes the operating surfaces 77, respectively, to contact opposite flanges of the connecting rod I-beam section from the flanges shown contacted in Figs. 1 and 2, and pressure applied to the ram when said handle 76 is toward the left in Fig. 2 will result in anti-clockwise twisting of a connecting rod I-beam section.

In the practical operation of the machine, and assuming that the ram 23 is in a depressed position, said ram is first elevated so that the upper and lower tools engage the work by employment of the mechanical lift in the manner as described. This is so whether a connecting rod to be operated upon is to be bent or twisted. Thereafter, the handle 34 is swung downwardly to remove the pawl 29 from the notches or teeth 28 of the plate 27, to the position of overhanging gravity of said pawl, and with the pawl in receded position, the pump is operated to apply lifting pressure against the lower surface of the ram. When the operation of bending or twisting is complete, the handle 34 is swung upwardly to actuate the rods 60 and 61 and unseat the valve 62, and the ram 23 returns to a depressed position by gravity, forcing the fluid, which may be water, out of the hollow cylinder 22 through the port 58, the passageway 57, the passageway about the reduced portion of the rod 61 and the passageway 36 into the well 21. When the same or a different connecting rod is to be again operated upon, the rod is placed on the rocker jaws 68 and 69, the pawl 29 is manually swung into engagement with the notches or teeth 28 of the plate 27, and the operations as described are repeated.

When a connecting rod is to be bent, the upper tool is of course set as in Fig. 3 before the bending operation is commenced, and when a rod is to be twisted, the upper tool is previously set as in Figs. 1 and 2, and the handle 76 is adjusted as before described, toward right or left, depending upon the direction in which it is desired to make the twist.

Having now described my invention, what I claim and desire to protect by Letters Patent is as follows:—

1. In a machine of the character described, a supporting tool including an element for operating upon a connecting rod, a complemental tool including an element for operating upon said connecting rod in cooperation with the tool first mentioned, a vertically movable ram carrying said supporting tool, a mechanical lift including a pump plunger, a pawl carried by said pump plunger and adapted to be manually engaged with said ram and mechanism for reciprocating said pump plunger, said mechanism being adapted to raise the pump plunger while the pawl is engaged with the ram to elevate said ram to bring said tools into cooperative engagement with said connecting rod, and hydraulic means responsive to reciprocations of said pump plunger for further elevating said ram to cause the tools to accomplish a working operation upon said connecting rod, said mechanism being adapted to cause said pawl to be moved out of engagement with said ram to a position of overhanging gravity clear of said ram upon the lowering of said pump plunger, whereby to offer no interference to reciprocations of said pump plunger during the operation of said hydraulic means.

2. In a machine of the character described, a supporting tool including an element for operating upon a connecting rod, a complemental tool including an element for operating upon said connecting rod in cooperation with the tool first mentioned, a vertically movable ram carrying said supporting tool, a mechanical lift including a pump plunger, a pawl carried by said pump plunger and adapted to be manually engaged with said ram and mechanism for reciprocating said pump plunger, said mechanism being adapted to raise the pump plunger while the pawl is engaged with the ram to elevate said ram to bring said tools into cooperative engagement with said connecting rod, hydraulic means responsive to reciprocations of said pump plunger for further elevating said ram to cause the tools to accomplish a working operation upon said connecting rod, said mechanism being adapted to cause said pawl to be moved out of engagement with said ram to a position of overhanging gravity clear of said ram upon the lowering of said pump plunger, whereby to offer no interference to reciprocations of said pump plunger during the operation of said hydraulic means, and means for rendering said hydraulic means inoperative to thus cause said ram to remove said tools from cooperative engagement with said connecting rod.

3. In a machine of the character described, a supporting tool including an element for operating upon a connecting rod, a complemental tool including an element for operating upon said connecting rod in cooperation with the tool first mentioned, a vertically movable ram carrying said supporting tool, a cylinder in which said ram is movable, a well for fluid, a mechanical lift including a pump plunger, a pawl carried by said pump plunger and adapted to be manually engaged with said ram and mechanism for reciprocating said pump plunger, said mechanism being adapted to raise the pump plunger while the pawl is engaged with the ram to elevate said ram to bring said tools into cooperative engagement with said connecting rod and to draw fluid from said well into said cylinder beneath said ram, means for normally precluding the passage of fluid from said cylinder to said well, hydraulic means responsive to reciprocations of said pump plunger for further elevating said ram to cause the tools to accomplish a working operation upon said connecting rod, said mechanism being adapted to cause said pawl to be moved out of engagement with said ram to a position of overhanging gravity clear of said ram upon the lowering of said pump plunger, and means for opening a passage for fluid from said cylinder to said well to allow said ram to become depressed by gravity and remove said tools from cooperative engagement with said connecting rod.

4. In a machine for twisting the I-beam sections of connecting rods, oscillatably mounted anvil members each including spaced apart working elements adapted to engage the opposite end portions of the spaced flanges, respectively, of an I-beam section of a connecting rod at one side thereof, a tool including spaced apart working elements one of which is adapted to engage one flange of said I-beam section of said connecting rod and the other of which is adapted to engage the other flange of said I-beam section of said connecting rod at the side thereof opposite said anvil members, and means for causing said working elements of said anvil members and said tool to cooperatively engage said I-beam section and bear with pressure thereagainst.

5. In a machine for twisting the I-beam sections of connecting rods, oscillatably mounted anvil members each including spaced apart working elements adapted to engage the opposite end portions of the spaced flanges, respectively, of an I-beam section of a connecting rod at one side thereof, a tool including spaced apart working elements one of which is adapted to engage one flange of said I-beam section of said connecting rod and the other of which is adapted to engage the other flange of said I-beam section of said connecting rod at the side thereof opposite said anvil members, means for adjusting said tool so that either of the working elements of the tool can selectively engage either of the flanges of said I-beam section while the other working element of the tool engages the other flange of the I-beam section, and means for causing said working elements of said anvil members and said tool to cooperatively engage said I-beam section and bear with pressure thereagainst.

6. In a machine of the character described, a supporting tool including an element for operating upon a connecting rod, a complemental tool including an element for operating upon said connecting rod in cooperation with the tool first mentioned, a mechanical lift for elevating said supporting tool to position where said tools cooperatively engage said connecting rod, hydraulic means for further elevating said supporting tool to cause the tools to accomplish a working operation upon said connecting rod, and means actuated by manipulation of said hydraulic means for rendering said mechanical lift inoperative upon commencement of operation of the hydraulic means.

7. In a machine of the character described, a supporting tool including an element for operating upon a connecting rod, a complemental tool including an element for operating upon said connecting rod in cooperation with the tool first mentioned, a vertically movable ram carrying said supporting tool, a mechanical lift for elevating said ram to bring said tools cooperatively into engagement with said connecting rod, hydraulically actuated means for further elevating said ram to cause the tools to accomplish a working operation upon said connecting rod, and means for rendering said mechanical lift inoperative upon commencement of operation of said hydraulically actuated means, said last mentioned means being actuated by manipulation of the hydraulically actuated means.

8. In a machine of the character described, a supporting tool including an element for operating upon a connecting rod, a complemental tool including an element for operating upon said connecting rod in cooperation with the tool first mentioned, a vertically movable ram carrying said supporting tool, a mechanical lift for elevating said ram to bring said tools cooperatively into engagement with said connecting rod, hydraulic means for further elevating said ram to cause the tools to accomplish a working operation upon said connecting rod, means for rendering said mechanical lift inoperative upon commencement of operation of said hydraulic means, and means for causing said ram to become depressed by gravity upon completion of said working operation.

9. In a machine for twisting articles, oscillatably mounted anvil members each including spaced apart working elements adapted to engage the opposite end portions of an article at one side thereof, a tool including spaced apart working elements one of which is adapted to engage an end portion of said article adjacent an edge of the article and the other of which is adapted to engage the opposite end portion of said article adjacent the edge of the article opposite that engaged by the before mentioned tool working element at the side of said article opposite said anvil members, and means for causing said working elements of said anvil members and said tool to cooperatively engage said article and bear with pressure thereagainst.

10. In a machine for twisting articles, oscillatably mounted anvil members each including spaced apart working elements adapted to engage the opposite end portions of an article at one side thereof, a tool including spaced apart working elements one of which is adapted to engage an end portion of said article adjacent an edge of the article and the other of which is adapted to engage the opposite end portion of said article adjacent the edge of the article opposite that engaged by the before mentioned tool working element at the side of said article opposite said anvil members, means for adjusting said tool so that either of the working elements of the tool can selectively engage the article adjacent either of its edges while the other working element of the tool engages the article adjacent its opposite edge, and means for causing said working elements of said anvil members and said tool to cooperatively engage said article and bear with pressure thereagainst.

EWALD A. ARP.